United States Patent
Mahnashi

(10) Patent No.: US 12,438,456 B1
(45) Date of Patent: *Oct. 7, 2025

(54) SOLAR POWER VOLTAGE CONVERTER SYSTEM

(71) Applicant: KING FAHD UNIVERSITY OF PETROLEUM AND MINERALS, Dhahran (SA)

(72) Inventor: Yaqub Alhussain Mahnashi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/243,775

(22) Filed: Jun. 20, 2025

Related U.S. Application Data

(63) Continuation of application No. 18/521,592, filed on Nov. 28, 2023, now Pat. No. 12,355,348.

(51) Int. Cl.
  *H02M 3/07* (2006.01)
  *H02M 1/00* (2006.01)
  *H02M 1/088* (2006.01)

(52) U.S. Cl.
  CPC ........... *H02M 3/07* (2013.01); *H02M 1/0095* (2021.05); *H02M 1/088* (2013.01)

(58) Field of Classification Search
  CPC ...... H02M 3/07; H02M 3/071; H02M 1/0095; H02M 1/088
  See application file for complete search history.

(56) References Cited

U.S. PATENT DOCUMENTS

| | | | |
|---|---|---|---|
| 11,626,796 B2 * | 4/2023 | Zafarana | H02M 3/01 327/536 |
| 11,689,200 B2 | 6/2023 | Cretu | |
| 12,107,498 B2 * | 10/2024 | Rizzolatti | H02M 1/0095 |
| 2012/0092903 A1 | 4/2012 | Nania | |
| 2012/0126627 A1 * | 5/2012 | Tonicello | H02J 7/35 307/82 |
| 2017/0222538 A1 | 8/2017 | Jung et al. | |

(Continued)

FOREIGN PATENT DOCUMENTS

| | | |
|---|---|---|
| CN | 104410271 A | 3/2015 |
| CN | 110707923 A | 1/2020 |

*Primary Examiner* — Sibin Chen
(74) *Attorney, Agent, or Firm* — Oblon, McClelland, Maier & Neustadt, L.L.P.

(57) ABSTRACT

A voltage converter system includes a negator coupled to a switched-capacitor converter (SCC). The negator circuit is coupled to an input terminal and generates a negative input voltage signal. The negator circuit includes a flying capacitor, a pair of first switches and a pair of second switches connected in a H-bridge configuration. The SCC is coupled to the input terminal and the negator circuit. The SCC includes a plurality of converter stages. Each stage of the plurality of converter stages includes a capacitor and an assembly of a first switch and a second switch. The system further includes a control unit, to activate or deactivate the pair of first switches, the pair of second switches, each of the first switches, and each of the second switches. A configuration of the negator circuit and the SCC results in a voltage conversion ratio between the output voltage signal and the input voltage signal.

12 Claims, 8 Drawing Sheets

(56) References Cited

U.S. PATENT DOCUMENTS

| | | | |
|---|---|---|---|
| 2020/0266703 A1 | 8/2020 | Janabi et al. | |
| 2022/0115953 A1* | 4/2022 | Rainer | H02M 7/4837 |
| 2022/0407426 A1 | 12/2022 | Takeshita | |
| 2023/0179181 A1* | 6/2023 | Hua | H02M 3/07 |
| | | | 327/337 |

* cited by examiner

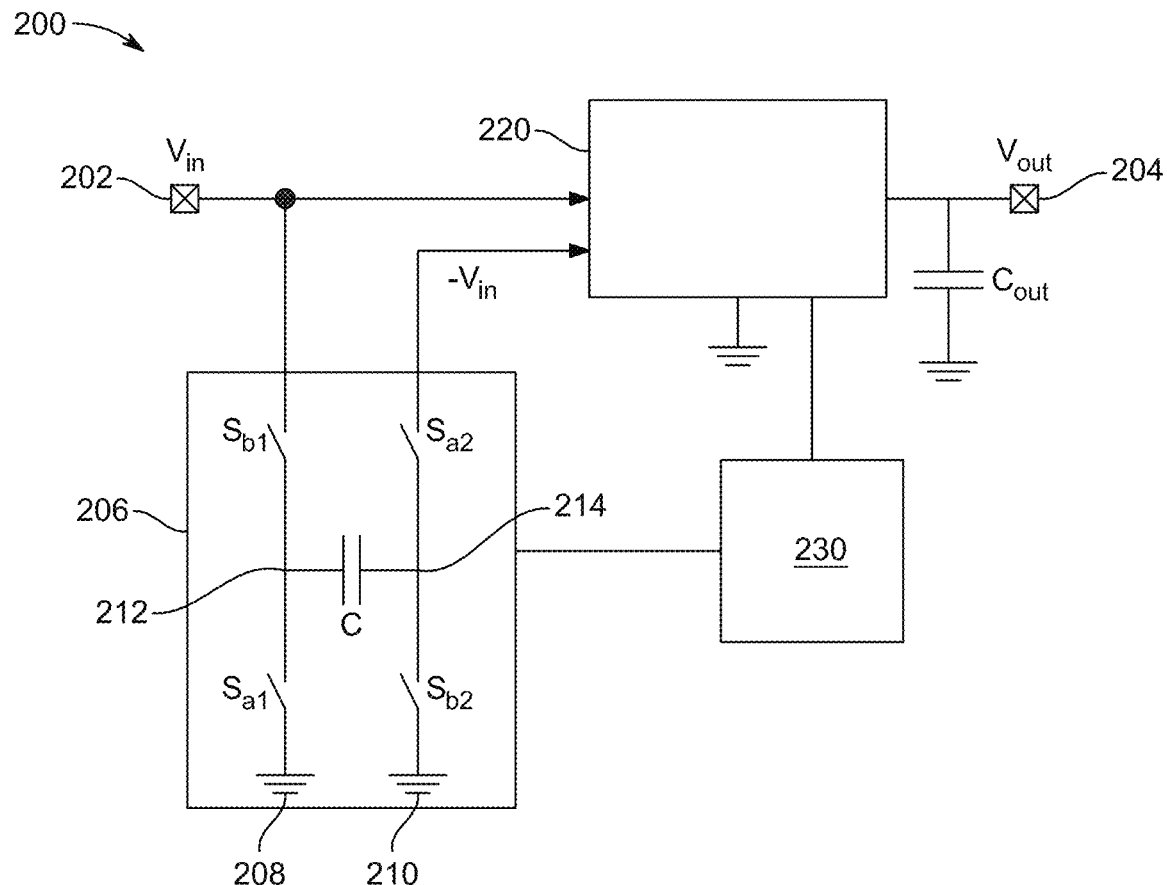
FIG. 2A
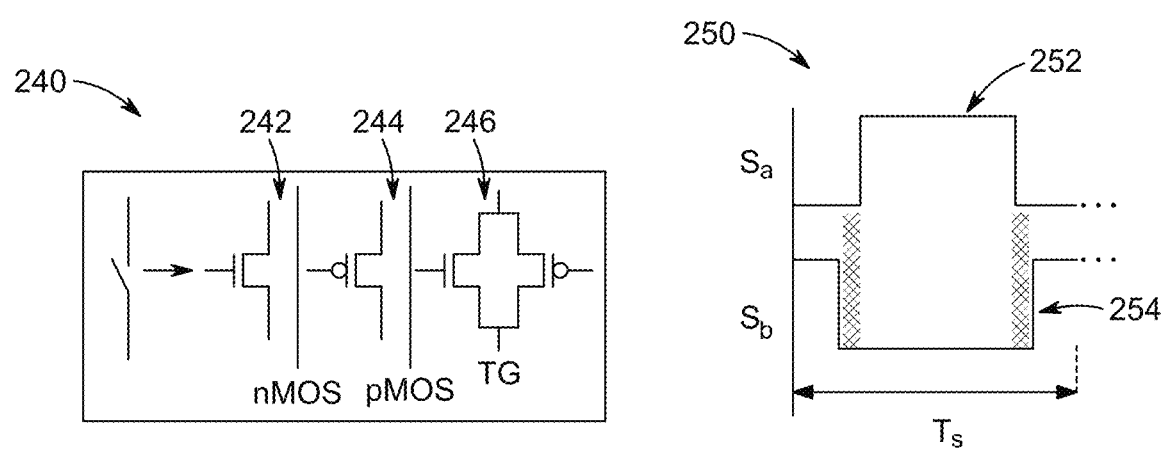
FIG. 2B
FIG. 2C

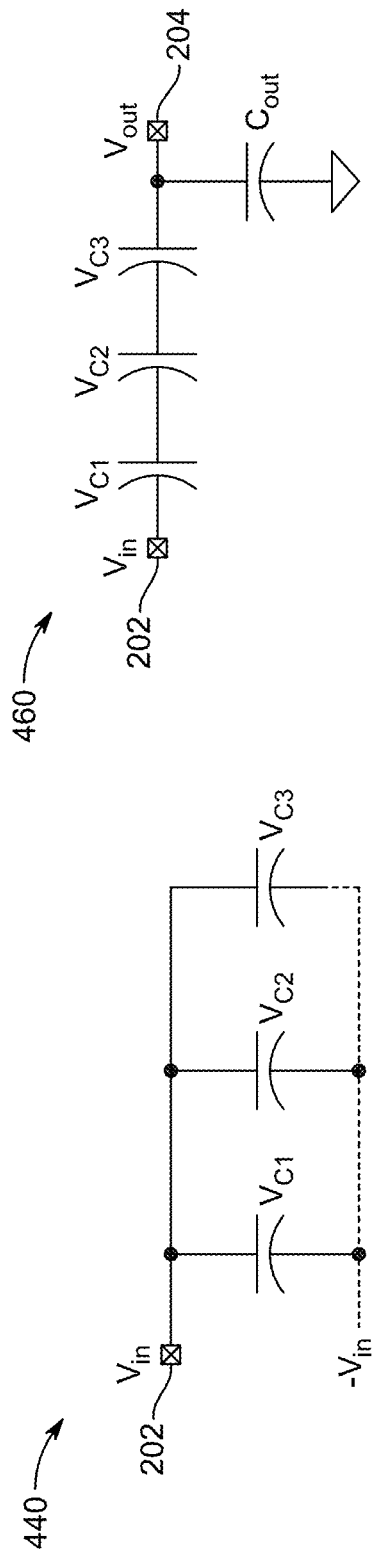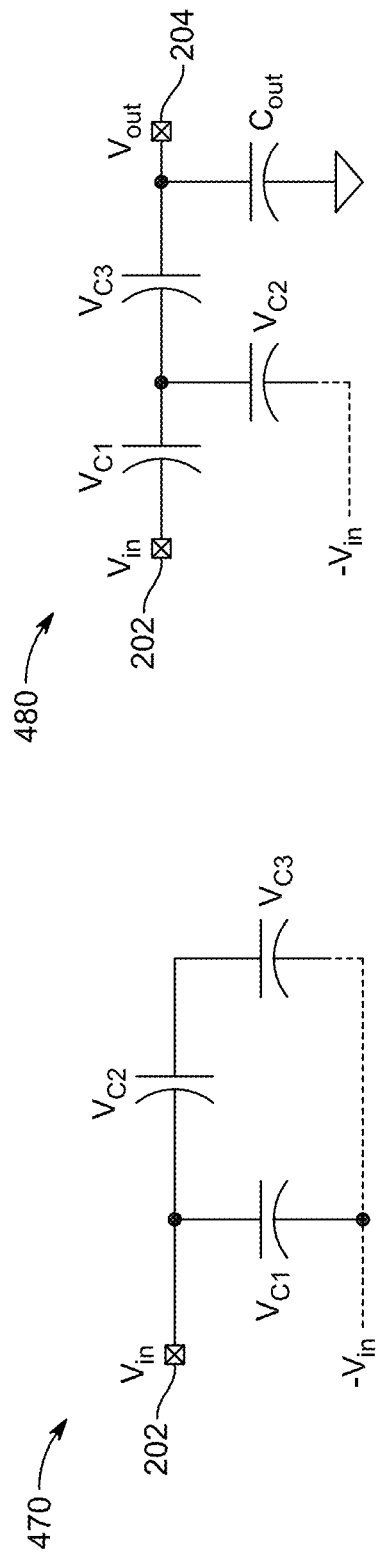

SOLAR POWER VOLTAGE CONVERTER SYSTEM

CROSS-REFERENCE TO RELATED APPLICATIONS

The present application is a Continuation of U.S. application Ser. No. 18/521,592, now allowed, having a filing date of Nov. 28, 2023.

STATEMENT OF PRIOR DISCLOSURE BY AN INVENTOR

Aspects of the present application were described in "A New Approach to Improve the Voltage Conversion Ratio in Topological Switched-Capacitor DC-DC Converters Using Negator Stage," Yaqub Mahnashi, IEEE Transactions on Circuits and Systems II: Express Briefs, Volume 70, Issue 4, 1465-1469, Dec. 1, 2022, which is incorporated herein by reference in its entirety.

STATEMENT OF ACKNOWLEDGEMENT

Support provided by the Deanship of Scientific Research (DSR), King Fahd University of Petroleum and Minerals (KFUPM), Riyadh, Saudi Arabia, through funding project #SR181026 is gratefully acknowledged.

BACKGROUND OF THE INVENTION

Technical Field

The present disclosure is directed to a voltage converter system, in particular, a device and a system utilizing a topological switched-capacitor DC-DC converter connected to a negator stage to achieve a voltage conversion ratio (VCR) that exceeds the theoretical attainable VCR of conventional topological switched-capacitor DC-DC converters (SCC).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The switched-capacitor DC-DC converter (SCC) has been very attractive due to its magnetic-less feature which lends itself to IC integration and high-power density. A conventional switched-capacitor converter (SCC) includes a DC-DC switching regulator that uses a combination of capacitors and switches to transfer charges between an input terminal and an output terminal. SCCs comprise a switch network implemented using transistor or diodes and flying capacitors. SCC provides several advantages, including better on-die integration, low electro-magnetic interference (EMI), and low cost. The SCC is used to convert an input voltage to a different output voltage. The relation between an output voltage and an input voltage of a switched-capacitor converter is described by a voltage conversion ratio (VCR) of the switched-capacitor converter. The SCC may be arranged as an up converter to provide an output voltage greater than the input voltage or a down converter to provide the output voltage lower than the input voltage. The SCC includes one or more capacitors arranged in different sub-circuit configurations between the input terminal and the output terminal using multiple switches. In one known arrangement, a controller cyclically controls the switches between a charging phase and a discharging phase. In the charging phase, the switches are set to arrange the capacitors into a first subcircuit configuration, and the capacitors are charged. In the discharging phase, the switches are controlled such that the capacitors are arranged in a second subcircuit configuration, different from the first configuration, and the capacitors are discharged. Different numbers of capacitors and different subcircuit arrangements allow the SCCs to provide a large number of different voltage conversion ratios (VCRs).

Based upon the formation of the circuit, SCC can be categorized into two main groups: a topological SCC, and a non-topological SCC. The topological SCC is produced based on well-established structures, for example, a Dickson charge pump, a series-parallel converter (SPSC), a Fibonacci switched capacitor (FSC), an exponential charge pump, and a binary SCC. In the non-topological SCC, the switch network and the flying capacitors are structured in an ad hoc way.

The conventional SCCs experience a number of issues, including poor output voltage regulation in the presence of variable input voltage or load current and a decline in efficiency as the VCR departs from a defined ratio for a particular topology and operating mode. The fundamental limitation of SCCs relates to a maximum attainable voltage conversion ratio (VCR) for a certain number of components. Conventionally, SCCs have shown to achieve higher VCR with a minimum number of component count. But the efficiency of the SCC is affected by the intrinsic characteristics of the switches and capacitors used in the circuit, thus limiting the number of components and generated VCR to a certain value. For applications that require high VCR, resonant converters that use both inductors and capacitors are often employed. A high VCR can also be achieved by increasing the number of converter stages of a SCC system. However, using cascaded SCC stages means using more components, which can lead to added power losses.

Accordingly, there is a need for a voltage converter system that provides a high voltage conversion ratio (VCR) with fewer components and high efficiency without adding considerable cost and complexity. The present disclosure meets such a need by connecting a converter stage to a topological switched-capacitor DC-DC converter. The embodiments of the present disclosure achieve a voltage conversion ratio (VCR) that exceeds the theoretical attainable VCR of conventional topological switched-capacitor DC-DC converters (SCC).

SUMMARY

In an exemplary embodiment, a voltage converter system is described. The system includes an input terminal, an output terminal, a negator circuit, a switched-capacitor converter, and a control unit. The input terminal is configured to receive an input voltage signal. The output terminal is configured to generate an output voltage signal. The negator circuit is coupled to the input terminal and is configured to provide a polarity conversion of the received input voltage signal to generate a negative input voltage signal. The negator circuit includes a flying capacitor, a pair of first switches and a pair of second switches connected in a H-bridge configuration. The switched-capacitor converter is coupled to the input terminal and the negator circuit. The switched-capacitor converter includes a plurality of converter stages. Each stage of the plurality of converter stages includes a capacitor and an assembly of a first switch and a second switch, resulting in a plurality of first switches and a plurality of second switches. The control unit is configured to activate or deactivate the pair of first switches, the pair of second switches, the first switch, and the second switch. A configuration of the negator circuit and the switched-capacitor converter results in a voltage conversion ratio between the output voltage signal and the input voltage signal.

In another exemplary embodiment, a voltage converter is described. The voltage converter includes an input terminal, a negator circuit, a switched-capacitor converter, a control unit, and an output terminal. The negator circuit is coupled to the input terminal. The negator circuit includes a capacitor, a first pair of switches and a second pair of switches connected in a H-bridge configuration. A first switch of the second pair of switches is connected to the input terminal on a first end and to a first common point on a second end. A first switch of the first pair of switches is connected to the first common point on a first end and a first ground terminal on a second end. A second switch of the second pair of switches is connected to a second common point on a first end and a second ground terminal on a second end. A second switch of the first pair of switches is connected to the second common point on a first end and to an output of the negator circuit on a second end. The capacitor is coupled between the first common point and the second common point. A first input of the switched-capacitor converter is coupled to the input terminal, and a second input of the switched-capacitor converter is coupled to the output of the negator circuit. The control unit is connected to the negator circuit and the switched-capacitor converter. The output terminal is coupled to an output of the switched-capacitor converter.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is a high-level diagram illustrating an exemplary configuration of a voltage converter system, according to aspects of the present disclosure;

FIG. 2B represents various types of switches used in the voltage converter system, according to aspects of the present disclosure;

FIG. 2C represents clock pulses generated by a control unit, according to aspects of the present disclosure;

FIG. 4C is a schematic diagram illustrating charging phase of SPSC, according to aspects of the present disclosure;

FIG. 4D is a schematic diagram illustrating pumping phase of SPSC, according to aspects of the present disclosure;

FIG. 4E is a schematic diagram illustrating charging phase of FSC, according to aspects of the present disclosure;

FIG. 4F is a schematic diagram illustrating pumping phase of FSC, according to aspects of the present disclosure;

DETAILED DESCRIPTION

Figure 1A:
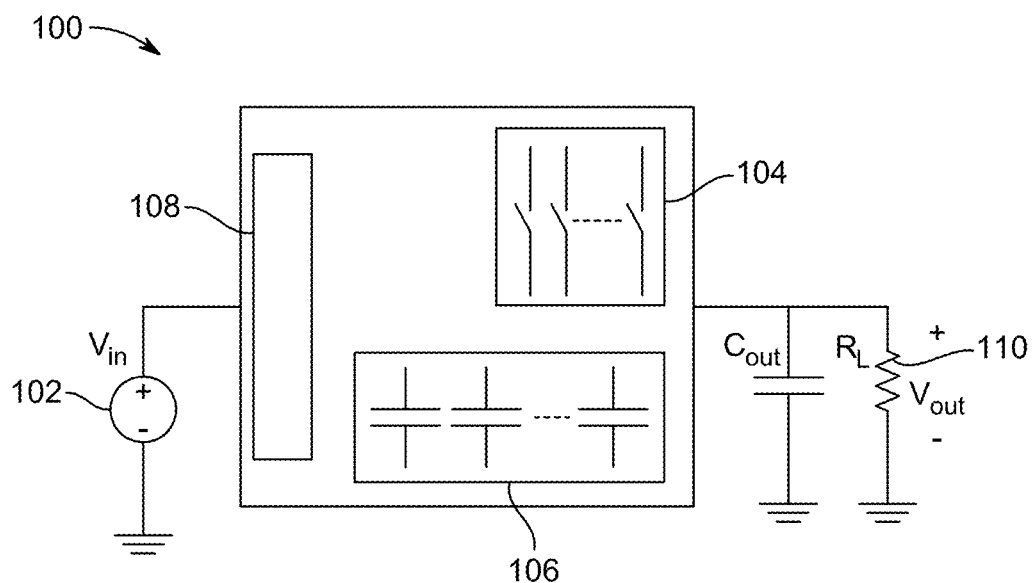
FIG. 1A illustrates a schematic circuit diagram of a switched-capacitor converter (SCC)

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a voltage converter system and a voltage converter. In the present disclosure, the voltage converter system is configured to provide an enhanced voltage conversion ratio (VCR) in comparison to a conventional switched-capacitor DC-DC converters (SCCs). In conventional SCCs, the terminals are connected to an input voltage, an output voltage, or the ground reference. The disclosed system makes use of the terminals that are grounded. The voltage converter system connects the ground-connected terminals to a negative input voltage supplied by a negator stage rather than the ground reference. In the present disclosure, two types of example configurations of topological SCCs are used i.e., a series-parallel switched-capacitor (SPSC) and a Fibonacci switched-capacitor (FSC). It is to be appreciated that while aspects of the present disclosure are used with respect to the two configurations, the present disclosure is capable of being configured with other topological SCCs, such as, for example, a Dickson charge pump, an exponential charge pump, and a binary SCC, as well as, with non-topological SCCs. In the aspects of the present disclosure, the voltage converter system is constructed and verified experimentally using a 3-stage SPSC and a 3-stage FSC. Similarly, the voltage converter system can be constructed for lesser or more number of stages of the well-known SCC structures, as described above. The experimental results show an error of less than 5% in the 3-stage SPSC and 3-stage FSC of the present disclosure.

The term "converter," as used herein, encompasses but is not limited to any one, or any combination of "regulator", "DC regulator", "voltage regulator", "DC voltage regulator", "DC-DC converter", "DC converter", "voltage converter", and "converter," and includes, but is not limited to, the plain meaning of any one or more of these terms.

FIG. 1A illustrates a schematic circuit diagram of the switched-capacitor converter 100 (also known as "switched-capacitor DC-DC converter") (hereinafter referred to as the "SCC 100").

The SCC 100 is configured to convert a DC input voltage into a higher or lower DC output voltage. The SCC 100 possesses certain advantages over an inductor-based converter, for example, a relatively low level of electromagnetic interference (EMI), because there is no stored energy in magnetic fields of inductors. The SCC 100 has been very attractive due to its magnetic-less feature which lends themselves to IC integration and high-power density. The SCC 100 may be configured to generate the DC output voltage that is a multiple of the DC input voltage (e.g., 2, 3 . . . N times) such as, in case of an up converter, or it may set the DC output voltage that is a fraction thereof (e.g., ½, ⅓ . . . 1/N times the input voltage), such as, in case of a down converter. Different topologies of the SCC 100 are capable of providing DC voltage step-up (i.e., boost converter) and DC voltage step-down (i.e., buck converter) with a topology dependent voltage conversion ratio (VCR) for example, 1:2 or 1:3 step-up conversion and 2:1 and 3:1 step-down conversion. In some implementations, the SCC 100 may also generate a negative output voltage from a positive input voltage. Since the SCC 100 does not require an inductor for voltage conversion, it is sometimes referred to as an inductor-less DC/DC converter.

As shown in FIG. 1A, the SCC 100 includes an input terminal 102, a switching circuit 104, a plurality of flying capacitors 106, a control unit 108, and an output terminal 110.

The SCC 100 of FIG. 1A may be implemented as an integrated circuit, as components on a printed circuit board (PCB), and/or any other similar circuitry. In some cases, the SCC 100 may be implemented as a device, apparatus, etc., having an integrated circuit, having components on a printed circuit board (PCB), and/or having any other similar circuitry. Generally, in reference to manufacturing and fabrication processes, electronic designers may employ various techniques to design integrated circuits, PCBs, and other similar circuitry, such as physical chips and/or physical layers.

The SCC 100 is electrically coupled to a power source (not shown in FIG. 1A). In certain implementations of the present disclosure, the power source may be an energy source, for example, a solar array. Examples of the power source include a battery, or a rechargeable battery. The input terminal 102 of SCC 100 is configured to receive an input voltage signal $V_{in}$ from the power source, for example from a rechargeable battery. The switching circuit 104 is configured to generate an output voltage signal $V_{out}$ according to requirements, based on a voltage conversion ratio (VCR). In an example, the switching circuit 104 is configured to change the DC component of the received input voltage signal $V_{in}$. The VCR is defined as the ratio of the DC output voltage $V_{out}$ to the DC input voltage $V_{in}$ under steady-state conditions:

$$VCR = \frac{V_{out}}{V_{in}} \quad (1)$$

VCR is also defined by quantifying SCC losses $R_{eq}$ including conduction losses and switching losses, the relationship between DC output voltage $V_{out}$ and the DC input voltage $V_{in}$, in such cases is defined as, $$V_{out} = VCR(V_{in}) - I_{out} R_{eq} \quad (2)$$

wherein, $I_{out}$ is the current measured at the output terminal 110.

In a structural aspect, the switching circuit 104 includes a plurality of switches in series, and a capacitor. The plurality of switches is selected from a group consisting of a transistor or a diode. In an example, the plurality of switches may have different conversion ratios, the same conversion ratio, and different voltage ratings. The power dissipated by the switching circuit 104 is ideally equal to zero. When the switch contacts are closed, then the voltage across the switch contacts is equal to zero and hence the power dissipation is zero. When the switch contacts are open, there is zero current, and the power dissipation is again equal to zero. Therefore, the ideal switching circuit is able to change the DC component of voltage (input voltage signal $V_{in}$) without dissipation of power. In an aspect, the switching circuit 104 is connected with a filter that is configured to remove the switching harmonics without dissipation of power.

An output voltage $v_s(t)$, which is equal to $V_{in}$, is obtained across the switch when the switch is in ON position and is equal to zero when the switch is in OFF position. The switch position varies periodically, such that $v_s(t)$ is a rectangular waveform having period $T_s$ and duty cycle D. The duty cycle is equal to the fraction of time that the switch is connected in the ON position. The switching frequency fs is equal to $1/T_s$. In an example, the SCC 100 produces the DC output voltage whose magnitude is controllable via the duty cycle D, using the switching circuit 104 that (ideally) does not dissipate power.

The plurality of flying capacitors 106 is configured to pump charges from one stage to another. The plurality of flying capacitors 106 is configured to store and transfer energy between different levels of the SCC. The flying capacitor 106 can help reduce the harmonic distortion of the voltage waveform, improving the overall power quality of the SCC 100. In an aspect, the plurality of flying capacitors 106 are connected in a series configuration, a parallel configuration, or in a combination of series and parallel to produce the desired voltage level.

In an operative aspect, the plurality of switches is selectively connected to the plurality of flying capacitors 106, depending upon the topology of the SCC. The switching circuit 104 is configured to charge the plurality of flying capacitors 106 and alternatingly discharge the plurality of flying capacitors 106 into an output capacitor $C_{out}$ at the output terminal 110.

The control unit 108 is configured to activate or deactivate the plurality of switches of the switching circuit 104. The control unit 108 is configured to drive the switching circuit 104 by generating a plurality of clock cycles. Since the output voltage $V_{out}$ is a function of the switch duty cycle D, the control unit 108 is further configured to vary the duty cycle to cause the output voltage to follow the required voltage.

The output terminal 110 is configured to generate the output voltage signal $V_{out}$ across the output capacitor $C_{out}$.

The SCC 100 may also include a pre-balancing circuit that includes a comparator circuit that is configured to monitor a voltage of the plurality of flying capacitors 106.

Figure 1B:
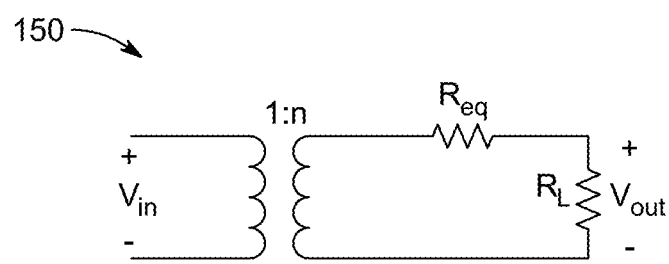
FIG. 1B illustrates an equivalent model of the SCC.

FIG. 1B illustrates an equivalent model 150 of the SCC 100.

During operation, the SCC 100 generates the output voltage signal $V_{out}$ which may be higher or lower than the input voltage signal depending on the topology of the SCC 100. The SCC 100 is particularly efficient when the nominal input voltage and output voltage are related by a certain ratio, illustrated by VCR, such as ⅓ or ½ or ⅔ or 2, or 3 or 5, etc. In an example, as shown in FIG. 1B, the SCC 100 has a VCR of 1:n. The $V_{out}$ is n times the $V_{in}$.

The conventional converters, for example, a Fibonacci switched capacitor (FSC) achieves a maximum VCR with a minimum number of components. The VCR achieved by the FSC (acting as a fundamental limit) is considered a benchmark in synthesizing the SCC to achieve a specific VCR. For applications that require high VCR, resonant converters that utilize both inductors and capacitors are commonly used.

FIG. 2A is a high-level diagram illustrating an exemplary configuration of a voltage converter system 200 (hereinafter referred to as the "system 200"). Referring to FIG. 2A, the system 200 includes an input terminal 202, an output terminal 204, a negator circuit 206, a switched-capacitor converter 220, and a control unit 230. The input terminal 202 of the system 200 is electrically coupled to a power source, or an energy source, for example, a rechargeable battery (not shown in FIG. 2A). The input terminal 202 is configured to receive an input voltage signal $V_{in}$ from the power source. In an example, the power source is a DC source such as a rechargeable battery, and a solar array.

The output terminal 204 is configured to generate an output voltage signal $V_{out}$ to be fed to an DC electrical load.

The negator circuit 206 is coupled to the input terminal 202 and receives the input voltage signal $V_{in}$ from the input terminal 202. The negator circuit 206 provides a polarity conversion of the received input voltage signal and generates a negative input voltage signal $(-V_{in})$. The negator circuit 206 includes a flying capacitor C, a pair of first switches, and a pair of second switches. The flying capacitor C, the pair of first switches ($S_{a1}$, $S_{a2}$) and the pair of second switches ($S_{b1}$, $S_{b2}$) are connected in a H-bridge configuration.

In an aspect, the pair of first switches ($S_{a1}$, $S_{a2}$) and the pair of second switches ($S_{b1}$, $S_{b2}$) of the negator circuit 206 are configured to charge the flying capacitor C of the negator circuit 206.

The pair of first switches ($S_{a1}$, $S_{a2}$) includes a first switch $S_{a1}$ and a second switch $S_{a2}$. In an example, the first switch $S_{a1}$ and the second switch $S_{a2}$ have similar characteristics (for example, cut-off characteristics, and saturation characteristics), therefore can be interchangeably used. The pair of second switches ($S_{b1}$, $S_{b2}$) includes a first switch $S_{b1}$ and a second switch $S_{b2}$. In an example, the first switch $S_{b1}$ and the second switch $S_{b2}$ have similar characteristics, therefore can be interchangeably used.

The first switch $S_{b1}$ of the second pair of switches ($S_{b1}$, $S_{b2}$) is connected to the input terminal 202 on a first end and to a first common point 212 on a second end. The second switch $S_{b2}$ of the second pair of switches ($S_{b1}$, $S_{b2}$) is connected to a second common point 214 on a first end. A second end of the second switch $S_{b2}$ of the second pair of switches ($S_{b1}$, $S_{b2}$) is connected to a second ground terminal 210.

The first switch $S_{a1}$ of the first pair of switches ($S_{a1}$, $S_{a2}$) is connected to the first common point 212 on a first end. A second end of the first switch $S_{a1}$ is connected to a first ground terminal 208. The second switch $S_{a2}$ of the first pair of switches ($S_{a1}$, $S_{a2}$) is connected to the second common point 214 on a first end. A second end of the second switch $S_{a2}$ of the first pair of switches ($S_{a1}$, $S_{a2}$) is connected to an output of the negator circuit 206. The flying capacitor C is coupled between the first common point 212 and the second common point 214.

The switched-capacitor converter 220 is coupled to the input terminal 202 and the negator circuit 206. A first input of the switched-capacitor converter 220 is coupled to the input terminal 202 for receiving input voltage signal $V_{in}$, and a second input of the switched-capacitor converter 220 is coupled to the output of the negator circuit 206 for receiving the negative input voltage signal $(-V_{in})$. In an aspect, the switched-capacitor converter 220 is at least one of the series-parallel switched-capacitor (SPSC) and the Fibonacci switched-capacitor (FSC).

The FSC is a converter that is known to have a VCR equal to the $(k+1)^{th}$ Fibonacci number $F_{(k+1)}$ and the number of switches equal to 3k−2, where k is the number of capacitors. The FSC can generate Fibonacci-numbered voltage conversion ratios.

The SPSC is a converter that can operate in both series configuration and parallel configuration. In SPSC, during a first phase of operation, the capacitors are stacked in the series configuration, whereas in a second phase of operation, the capacitors are stacked in the parallel configuration. During a charging phase, the capacitor voltage and the output voltage must add up to $V_{in}$, whereas in a discharging phase, the capacitor voltage and the output voltage must be equal to the output voltage. Therefore, the output voltage is equal to $V_{in}/2$.

Figure 4A:
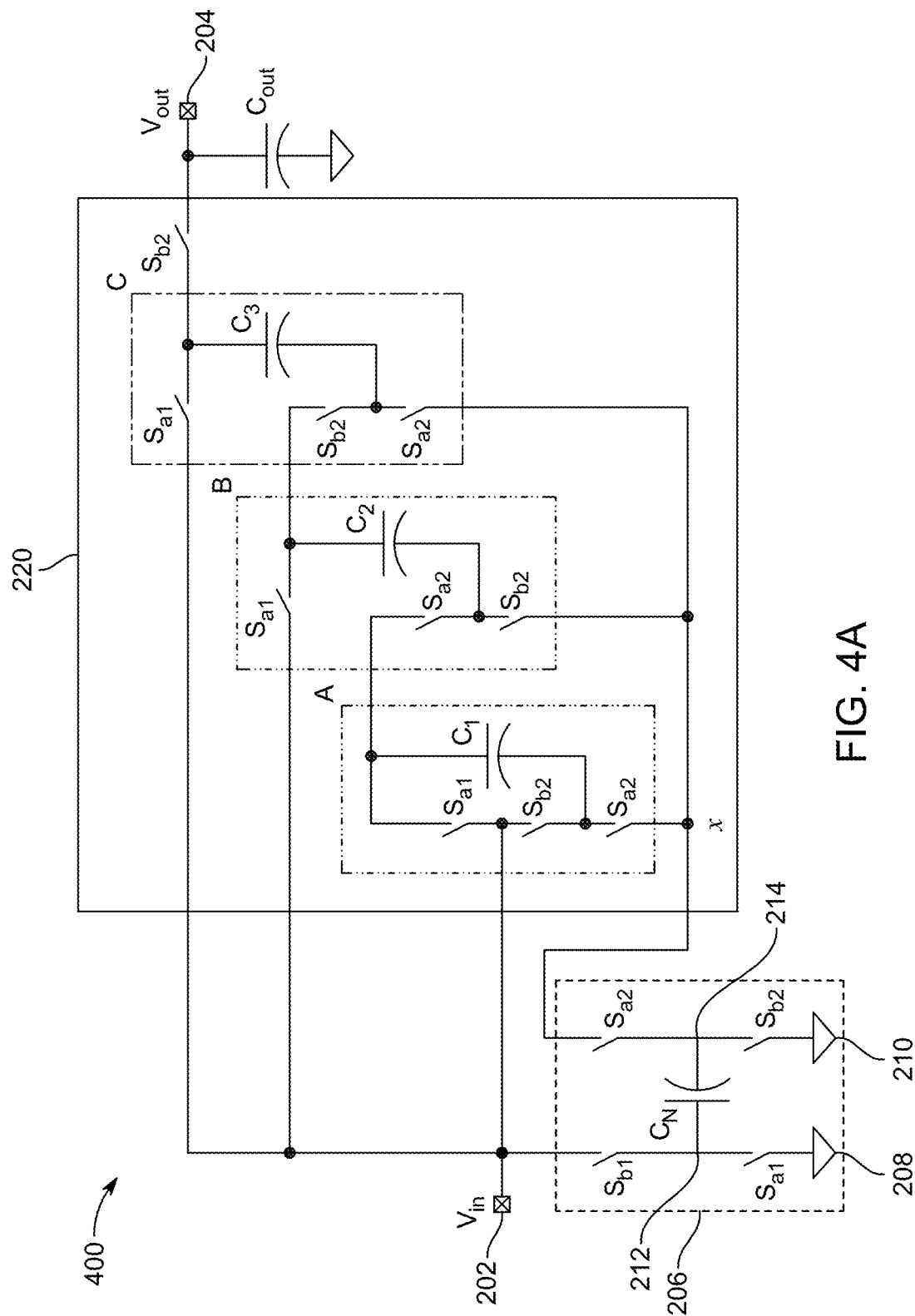
FIG. 4A is a schematic diagram illustrating an exemplary configuration of the voltage converter system having a 3-stage SPSC, according to aspects of the present disclosure.
Figure 4B:
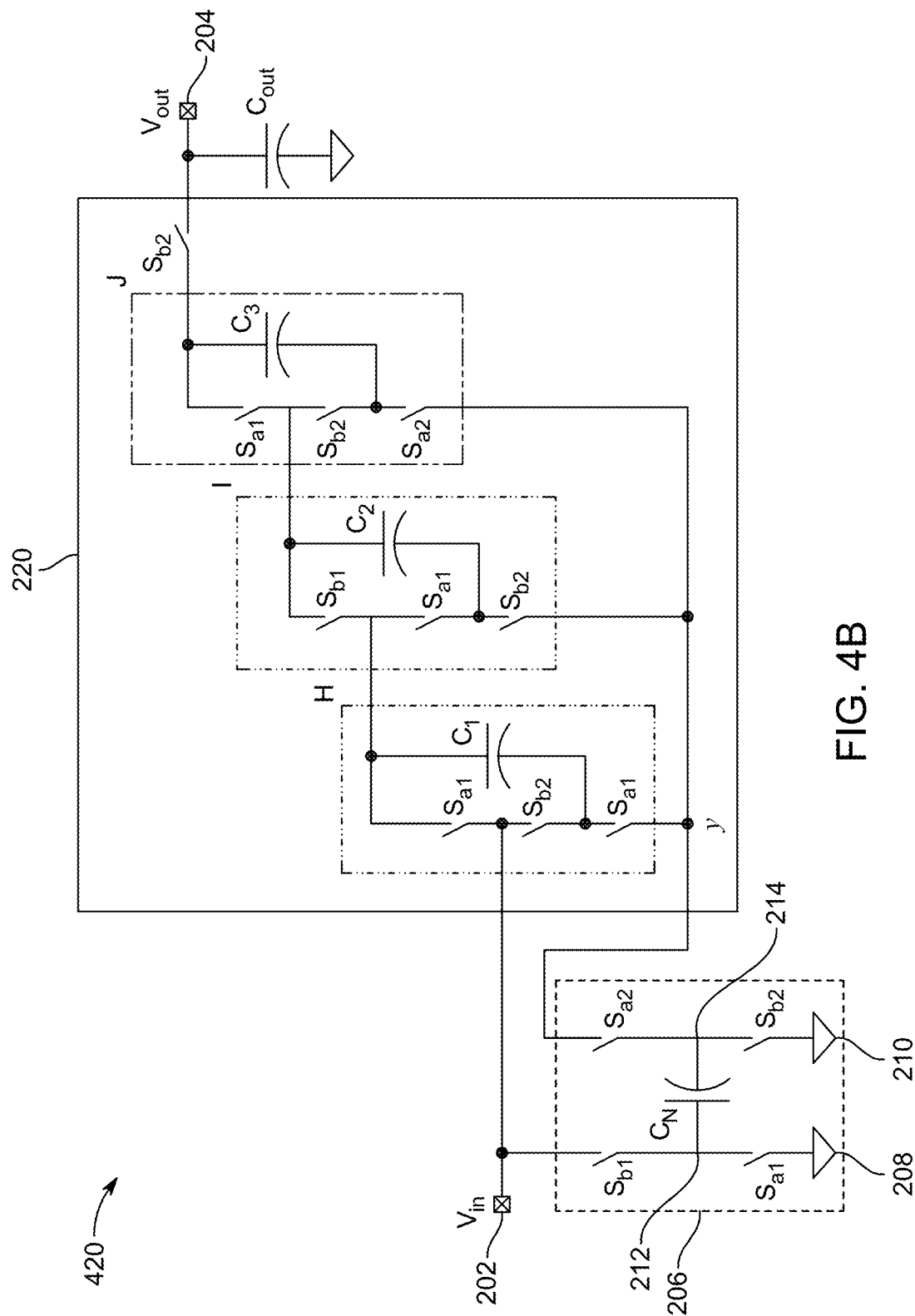
FIG. 4B is a schematic diagram illustrating an exemplary configuration of the voltage converter system having a 3-stage FSC, according to aspects of the present disclosure.

Referring to FIG. 4A-FIG. 4B, the switched-capacitor converter 220 includes a plurality of converter stages. In an example, the switched-capacitor converter 220 includes three (3) converter stages. Each stage of the plurality of converter stages includes a capacitor and an assembly of a first switch and a second switch. In an aspect, the assembly of the first switch and the second switch includes a combination of at least one of the first switch and a pair of the second switch. In another aspect, the assembly of the first switch and the second switch includes a combination of at least one of the second switch and a pair of the first switch. In an aspect, for each stage of the plurality of converter stages of the switched-capacitor converter, the assembly of the first switch and the second switch is configured to charge and discharge the capacitor.

The control unit 230 is connected to the negator circuit 206 and the switched-capacitor converter 220. The control unit 230 is configured to activate or deactivate the pair of first switches, the pair of second switches, each of the first switches, and each of the second switches. In an aspect, the control unit 230 includes two non-overlapping complementary clocks. In an aspect, the two non-overlapping complementary clocks are configured to be alternatively turned on and off, which consequently turn the pair of first switches, the pair of second switches, each of the first switches, and each of the second switches alternatively on and off.

A configuration of the negator circuit 206 and the switched-capacitor converter 220 results in a voltage conversion ratio between the output voltage signal and the input voltage signal.

In an aspect, the system 200 further includes an output capacitor $C_{out}$ coupled to the output terminal 204.

The system 200 is configured to operate in two phases. The two phases of operation of the system 200 includes a charging phase and a discharging phase. In the discharging phase, the system 200 is configured to generate the output voltage signal $V_{out}$.

The system 200 employs an arrangement to increase the VCR of the SCC 220 beyond the theoretical gain limits with fewer components count. The arrangement includes adding the negator circuit 206 prior to the switched-capacitor converter 220 that feeds a negative input voltage to at least one terminal of the switched-capacitor converter 220 as illustrated in FIG. 2A. Considering an ideal transformer model, the output voltage can easily be written as: $V_{out}=nV_{in}-I_{out}R_{eq}$. The ideal VCR (n=VCR) of the converter and $R_{eq}$ quantifies the SCC losses including conduction and switching losses. Here, n is a main steady-state parameter that determines the VCR of the switched-capacitor converter 220. In the present system 200, a lossless switched-capacitor converter 220 is assumed, i.e., $R_{eq}=0$, to study the effect of the arrangement on the ideal VCR.

FIG. 2B represents various types 240 of the switches used in the system 200. As shown in FIG. 2B, the first switch and the second switch are implemented using either an n-channel metal-oxide semiconductor (NMOS) 242, a p-channel metal-oxide-semiconductor (PMOS) 244, or a transmission gate (TG) configuration 246.

FIG. 2C represents a timing diagram 250 of clock pulses generated by the control unit.

As shown in FIG. 2C, two clock pulses 252 and 254 are generated by the control unit. The clock pulse 252 (also known as clock pulse $S_a$) is supplied to the switch $S_a$ and the clock pulse 254 (also known as clock pulse $S_b$) is supplied to the switch $S_b$. Both clock pulses $S_a$ and $S_b$ are configured to switch at $1/T_s$, are non-overlapping complementary clocks.

In general, the conventional SCC topologies can be designed to achieve high VCR. Nevertheless, the conventional SCC requires more components count for yielding high VCR. For example, an ideal VCR of five (5), i.e., $v_{out}=5v_{in}$, can be achieved using four stages of SPSC, and/or three stages of FSC, as follows:

$$v_{out_{SPSC}} = (k+1)v_{in}, \quad (1)$$

$$v_{out_{FSC}} = (F_{k+2})v_{in}, \quad (2)$$

where k is the number of flying capacitors and $F_k$ is $k^{th}$ the Fibonacci number. The Fibonacci numbers are a sequence of numbers where every number is the sum of the preceding two numbers. In an example, the converter losses are neglected for and only the ideal VCR is considered.

In an aspect, the system 200 synthesizes the SCC using a terminal weight. For the SCC, like SPSC or FSC, with j number of terminals, the $j^{th}$ terminal weight ($w_j$) can be assigned according to the required VCR. The terminal weight ($w_j$) can be only a positive or negative integer number and it is assigned mathematically to satisfy the following condition:

$$\sum_{j=1}^{k+2} w_j = 0, \quad (3)$$

where k is the number of flying capacitors used in the converter, and k+2 represents the number of all terminals.

In an example, the first terminal of the SCC is assigned a weight that is equal to the maximum attainable VCR, i.e., $w_1=VCR_{max}$. For example, 4-stage SPSC has a maximum VCR of five and hence $w_1=5$. The weight of the last terminal is always $-1$, which implies that $w_{(k+2)}=-1$. The other terminals of the SCC are assigned with weights based on the SCC topology. Therefore, equation 3 can be modified to be:

$$\sum_{j=2}^{k+1} w_j = 1 - w_1. \quad (4)$$

Considering a multiple-input, multiple-output (MIMO) SCC, the terminal weight can be used to relate the terminal voltages in the converter as follows:

$$\sum_{i=1}^{p} w_{v_{g_i}} v_{g_i} + \sum_{i=1}^{q} w_{v_{o_j}} v_{o_j} = 0, \quad (5)$$

where p is the number of inputs, q is the number of outputs, $v_g$ is the input voltage, $v_o$ is the output voltage (is equal to $V_{th}$) and w is the terminal weight.

In an example, considering a single-input single-output (SISO) SCC boost operation, the input voltage is connected to the first terminal and the output voltage is connected to the last terminal. By combining equation 4 and equation 5, the output voltage can be written as:

$$v_{out} = w_1 v_{in} + \sum_{j=2}^{k+1} w_j v_j, \quad (6)$$

where $w_1=VCR_{max}$, $w_j<0$ and $v_j$ is the voltage at the $j^{th}$ terminal that is usually set to zero, i.e., the terminal is grounded, in the conventional SCC topologies.

The system 200, as shown in FIG. 2A, utilizes the negator circuit 206 to provide the negative input voltage to one or more of the SCC terminals to achieve a higher VCR. If the negative input voltage is connected to all remaining SCC terminals, i.e., $v_j=-v_{in}$, equation (6) implies that the output voltage will increase and can be calculated as:

$$v_{out} = \left(w_1 + \sum_{j=2}^{k+1} |w_j|\right) v_{in}. \quad (7)$$

In the present system 200, equation (7) assumes that the output voltage of the negator circuit 206 is equal to $-v_{in}$. The output voltage of the negator circuit 206 can be slightly less due to the conduction loss and the switching loss of the negator circuit 206. Therefore, without loss of generality, the output voltage of the negator circuit 206, $v_{negator}$, can be used to compute the output voltage of the converter as:

$$v_{out} = w_1 v_{in} + \sum_{j=2}^{k+1} |w_j v_{negator}|. \quad (8)$$

During experiments, two configurations of the SCC (SPSC and FSC) were chosen, which represent a linear SCC and a non-linear SCC, respectively. Using equation (7), the output voltage of SPSC configuration and FSC configuration can be written as:

$$v_{out_{SPSC}} = (2k-1)v_{in}. \quad (9)$$

$$v_{out_{FSC}} = \left(\sum_{j=2}^{k+2} |F_j|\right) v_{in}. \quad (10)$$

Figure 3B:
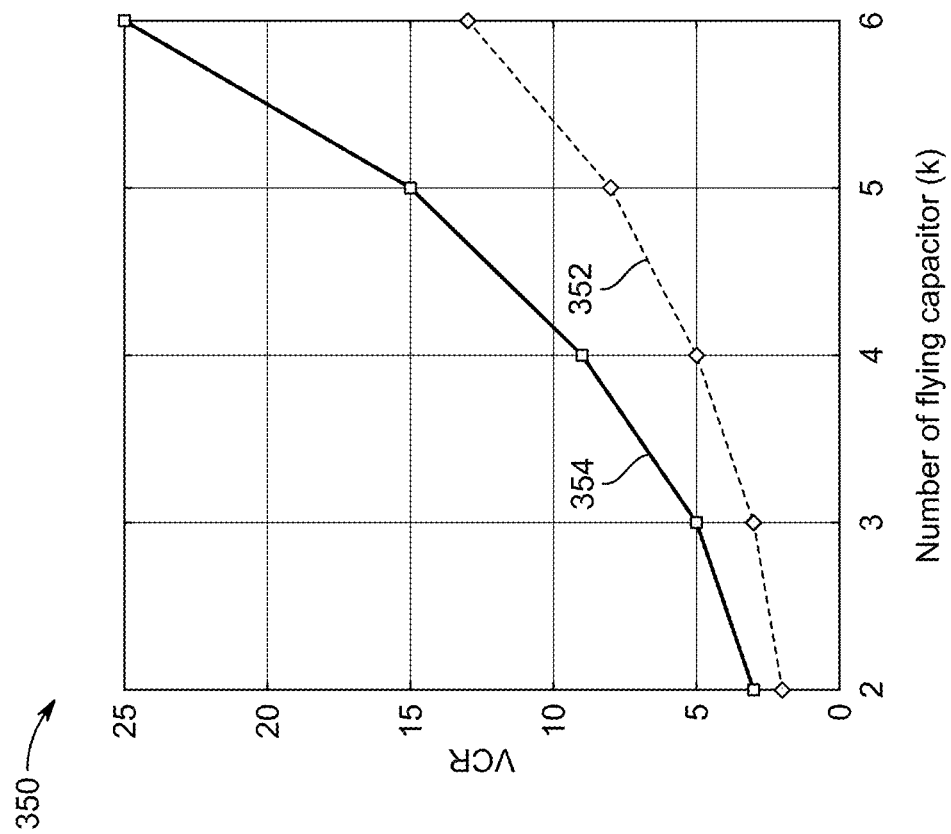
FIG. 3B is a graphical representation of comparison of the VCR versus the number of flying capacitors (k) for a conventional Fibonacci switched capacitor (FSC), and the voltage converter system having FSC, according to aspects of the present disclosure.
Figure 3A:
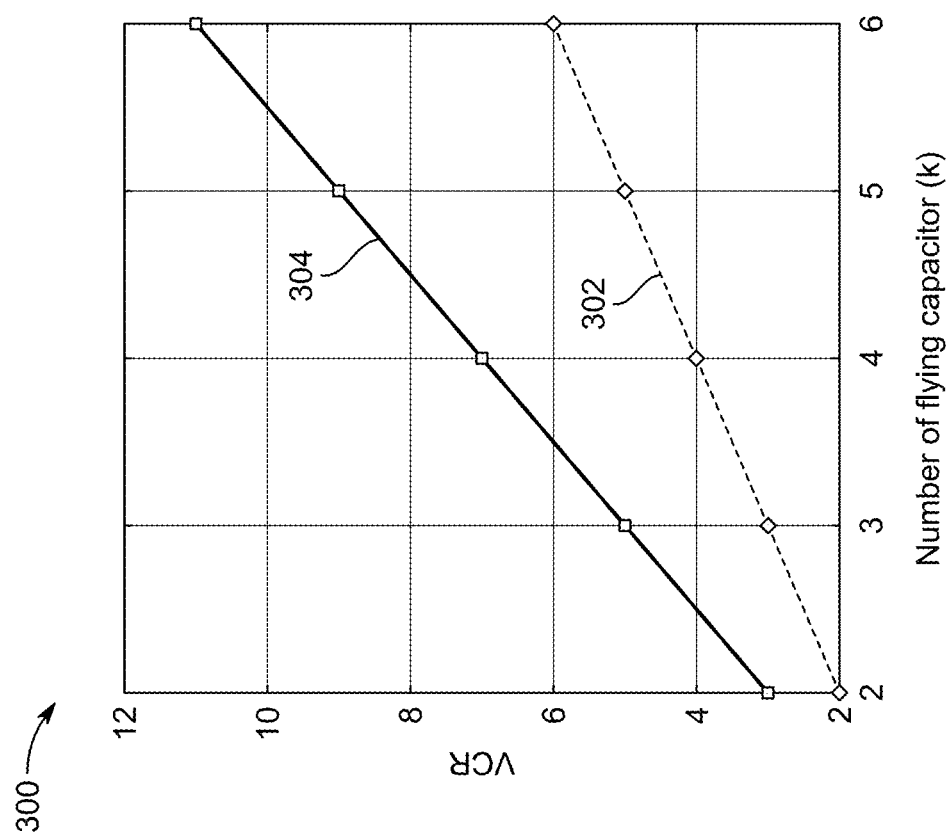
FIG. 3A is a graphical representation of comparison of a voltage conversion ratio (VCR) versus number of flying capacitors (k) for a conventional series-parallel switched-capacitor (SPSC), and the voltage converter system having SPSC, according to aspects of the present disclosure.

FIG. 3A is a graphical representation 300 of comparison of the VCR versus the number of flying capacitors (k) for a conventional Dickson charge pump (a series-parallel switched-capacitor (SPSC) configuration), and the system 200 having the SPSC. Signal 302 represents the VCR corresponding to the number of flying capacitors (k) for the conventional SPSC. Signal 304 represents the VCR corresponding to the number of flying capacitors (k) for the system 200 having the SPSC.

FIG. 3B is a graphical representation 350 of comparison of the VCR versus the number of flying capacitors (k) for a conventional FSC, and the voltage converter system having the FSC.

Signal 352 represents the VCR corresponding to the number of flying capacitors (k) for the conventional FSC. Signal 354 represents the VCR corresponding to the number of flying capacitors (k) for the system 200 having the FSC.

As shown in FIG. 3A-FIG. 3B, the present system 200 having SPSC and FSC outperform the conventional SPSC and FSC by achieving higher VCR. For low number of stages, the VCR of the conventional configurations and the system 200 are very close to each other. The VCR is growing significantly as the number of stages increases for the FSC case. On the other hand, the VCR increases linearly for the system 200 having the SPSC but with a steeper slope compared to the conventional SPSC. For the present system 200 having SPSC and FSC, VCR increases approximately (k-2) for SPSC, and $\Sigma_{j=2}^{k+1}|F_j|$ for FSC compared to the conventional ones. The negator circuit 206 acts as an additional stage, nevertheless, the system 200 outperforms the conventional SCC. For example, a 4-stage SPSC achieves VCR=5, while it can be increased to VCR=7 using the system 200 having a 3-stage SPSC and the negator circuit 206.

FIG. 4A is a schematic diagram 400 illustrating an exemplary configuration of the system 200 having 3-stage SPSC.

The negator circuit 206 is coupled to the input terminal 202 and is configured to provide a polarity conversion of the received input voltage signal to generate a negative input voltage signal ($-V_{in}$). The negator circuit 206 includes a flying capacitor $C_N$, a pair of first switches ($S_{a1}$, $S_{a2}$) and a pair of second switches ($S_{b1}$, $S_{b2}$). The flying capacitor $C_N$, the pair of first switches ($S_{a1}$, $S_{a2}$) and the pair of second switches ($S_{b1}$, $S_{b2}$) are connected in a H-bridge configuration.

The pair of first switches ($S_{a1}$, $S_{a2}$) includes the first switch $S_{a1}$ and the second switch $S_{a2}$. The pair of second switches ($S_{b1}$, $S_{b2}$) includes the first switch $S_{b1}$ and the second switch $S_{b2}$. In an aspect, the pair of first switches ($S_{a1}$, $S_{a2}$) and the pair of second switches ($S_{b1}$, $S_{b2}$) of the negator circuit 206 are configured to charge the flying capacitor $C_N$ of the negator circuit 206.

The switched-capacitor converter 220 is coupled to the input terminal 202 and the negator circuit 206. As shown in FIG. 4A, a first input of the switched-capacitor converter 220 is coupled to the input terminal 202 for receiving input voltage signal $V_{in}$, and a second input of the switched-capacitor converter is coupled to the output of the negator circuit (x point as shown in FIG. 4A).

As shown in FIG. 4A, the switched-capacitor converter 220 includes three converter stages (a first converter stage A, a second converter stage B, and a third converter stage C). For example, the first converter stage A includes a capacitor $C_1$, the second switch $S_{b2}$ and a pair of the first switch ($S_{a1}$, and $S_{a2}$). In an example, the second converter stage B includes a capacitor $C_2$, the second switch $S_{b2}$ and a pair of the first switch ($S_{a1}$, and $S_{a2}$). The third converter stage C includes a capacitor $C_3$, the second switch $S_{b2}$ and a pair of the first switch ($S_{a1}$, and $S_{a2}$). For each converter stage of the switched-capacitor converter 220, the assembly of the first switch and the second switch is configured to charge and discharge the capacitor.

FIG. 4B is a schematic diagram 450 illustrating an exemplary configuration of the voltage converter system having 3-stage FSC. As shown in FIG. 4A, a first input of the switched-capacitor converter 220 is coupled to the input terminal 202 for receiving $V_{in}$, and a second input of the switched-capacitor converter 220 is coupled to the output of the negator circuit (y point as shown in FIG. 4B). The switched-capacitor converter 220 is the 3-stage FSC.

As shown in FIG. 4B, the switched-capacitor converter 220 includes three converter stages (a first converter stage H, a second converter stage I, and a third converter stage J). For example, the first converter stage H includes a capacitor $C_1$, the second switch $S_{b2}$ and a pair of the first switch ($S_{a1}$, and $S_{a2}$). In an example, the second converter stage I includes a capacitor $C_2$, the first switch $S_{a1}$ and a pair of the second switch ($S_{b1}$, and $S_{b2}$). The third converter stage J includes a capacitor $C_3$, the second switch $S_{b2}$ and a pair of the first switch ($S_{a1}$, and $S_{a2}$).

The switches are driven using two complementary non-overlapping clock pulses, $S_a$, and $S_b$. To ensure a comprehensive understanding of the operation the system 200, a steady state for the charge in the flying capacitors is considered. The charging of the flying capacitors takes place in two main phases, a charging phase, and a pumping phase, throughout a complete switching cycle.

FIG. 4C is a schematic diagram 440 illustrating a charging phase of the SPSC. During the charging phase, the clock pulse $S_a$ is high, and the clock pulse $S_b$ is low. When the clock pulse $S_a$ is high and the clock pulse $S_b$ is low, all flying capacitors are fully charged.

FIG. 4D is a schematic diagram 460 illustrating a pumping phase of the SPSC. During the pumping phase, the clock pulse $S_a$ is high, and the clock pulse $S_b$ is low. In the pumping phase, the charges are pumped to the output terminal 204.

FIG. 4E is a schematic diagram 470 illustrating a charging phase of the FSC. During the charging phase, the clock pulse $S_a$ is high, and the clock pulse $S_b$ is low. When the clock pulse $S_a$ is high and the clock pulse $S_b$ is low, all flying capacitors are fully charged.

FIG. 4F is a schematic diagram 480 illustrating a pumping phase of the FSC. During the pumping phase, the clock pulse $S_a$ is low, and the clock pulse $S_b$ is high. In the pumping phase, the charges are pumped to the output terminal 204.

Further, the negator circuit 206 is assumed to be in steady-state, which implies that the voltage at nodes x and y equals $-V_{in}$.

Due to the capacitor charge balance, the voltage across capacitors remains effectively the same for one complete switching cycle. Therefore, for SPSC charging phase shown in FIG. 4C, $V_{C1}=V_{C2}=V_{C3}=2V_{in}$, and during the pumping phase, FIG. 4D, the output voltage can be found to be $7V_{in}$. Similarly, for the FSC case, FIG. 4E shows that $V_{C1}=2V_{in}$ and $V_{C2}=V_{C3}=2V_{in}$. On the other hand, $V_{C2}=4V_{in}$ during the pumping phase, FIG. 4F, which implies that $V_{C3}=6V_{in}$. Hence, the output voltage of the FSC is calculated as $9V_{in}$.

EXAMPLES AND EXPERIMENTS

The following examples are provided to illustrate further and to facilitate the understanding of the present disclosure. Experimental Data and Analysis In order to validate the efficacy of the system 200, developed in accordance with equation (7), 3-stage SPSC and 3-stage FSC were constructed, as illustrated in FIG. 4A-FIG. 4B. Further, the constructed 3-stage SPSC and 3-stage FSC were tested using an experimental setup depicted in FIG. 5.

Figure 5:
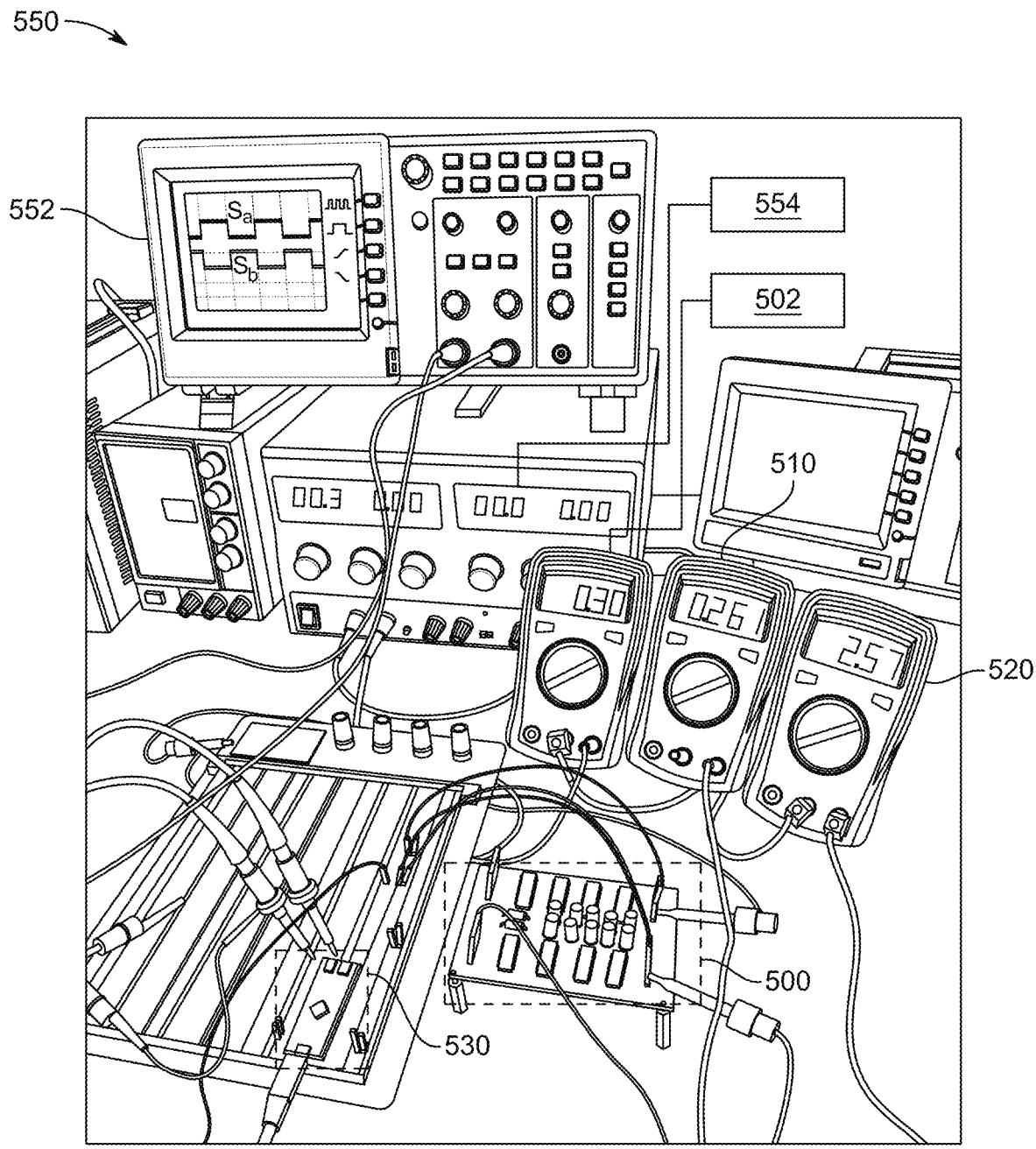
FIG. 5 is an experimental setup of the voltage converter system, according to aspects of the present disclosure.

FIG. 5 is an experimental setup 550 of the system. As shown in FIG. 5, the experimental setup 550 includes a switched-capacitor converter 500, an input terminal 502, a negator 510, an output terminal (SCC output terminal) 520, a control unit 530, an oscilloscope 552, and a power supply 554.

The input terminal 502 receives the input voltage signal. In an example, the switched-capacitor converter 500 was implemented using MC14066B analog switches (manufactured by ON Semiconductor Corp, located at 5701 N Pima Rd, Scottsdale, AZ 85250). The 10 µF capacitors were used as the flying capacitors and the output capacitors, and a resistor of 1 MΩ was used as a load. The output terminal 520 outputs the output voltage generated by the switched-capacitor converter 500.

The switches are driven by two non-overlapping complementary clocks, $S_a$ and $S_b$, generated from the control unit 530. In an example, the clock pulses ($S_a$ and $S_b$) have a switching frequency of 10 kHz and a deadtime of 124 ns. The oscilloscope 552 is configured to generate the clock pulses ($S_a$ and $S_b$). The control unit 530 is coupled to the oscilloscope 552 and generate a control signal for controlling operation of the oscilloscope 552. For example, TDS2021C oscilloscope (manufactured by Tektronix Inc, located at 14150 Southwest Karl Braun Drive, PO Box 500 Beaverton, OR 97077) was used.

The negator 510 generates the negative input voltage signal. The voltage measured at the output of the negator 510 was approximately 35 mV-50 mV lower than the input voltage.

The power supply 554 is configured to supply power to various components of the experimental setup 550. For example, a EL302T power supply (manufactured by Thurlby Thandar Instruments Ltd., located at Glebe Rd, Huntingdon, Cambridgeshire, PE29 7DR, United Kingdom) was used.

The input voltage, negator output voltage, and SSC output voltage were measured using various digital multimeters (DMMs) and were found to be 0.3 V, −0.26 V, and 2.57 V, respectively. Using equation (8), the output voltage was expected to be 2.54 V which results in 1.17% error. In similar manner, the experiment was conducted by varying the input voltage between 0.1 V-0.5 V, then the output voltage was measured in each scenario for the SPSC and FSC configurations. Using the output voltage expected by the system 200 in equation (8), the error is calculated as follows:

$$\text{Error} = \frac{|V_{theoretical} - V_{experimental}|}{V_{experimental}} * 100. \quad (11)$$

Figure 6B:
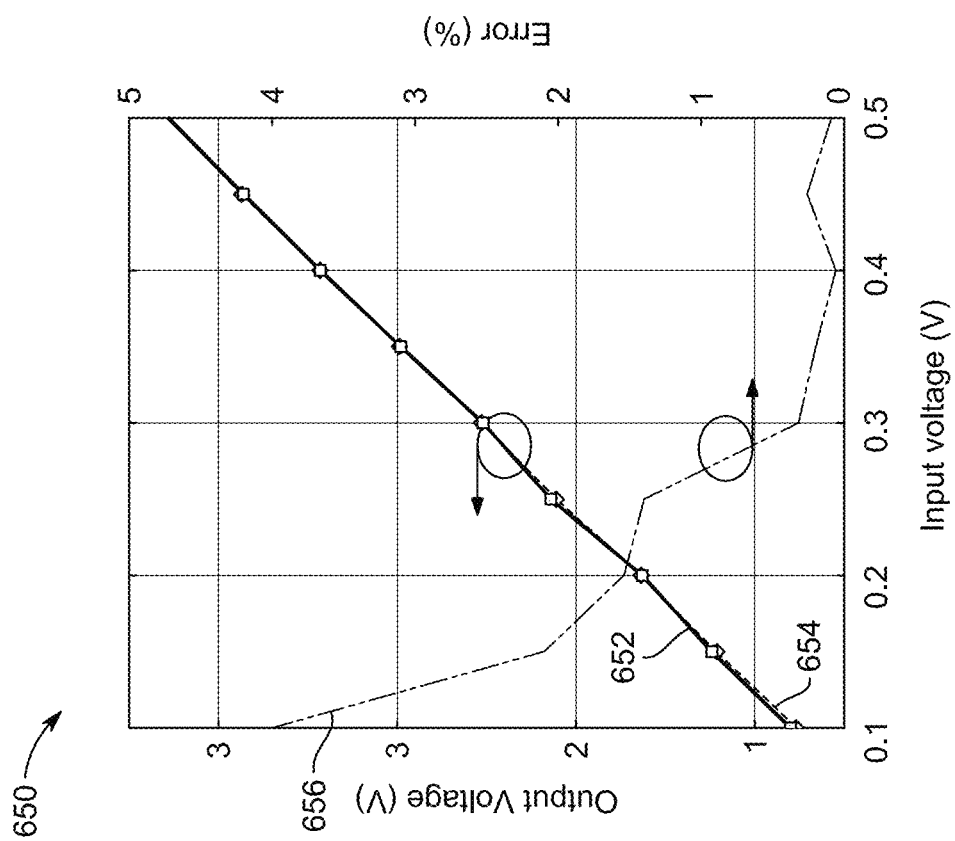
FIG. 6B is a representation of the output voltage versus input voltage for the voltage converter system having FSC, according to aspects of the present disclosure.
Figure 6A:
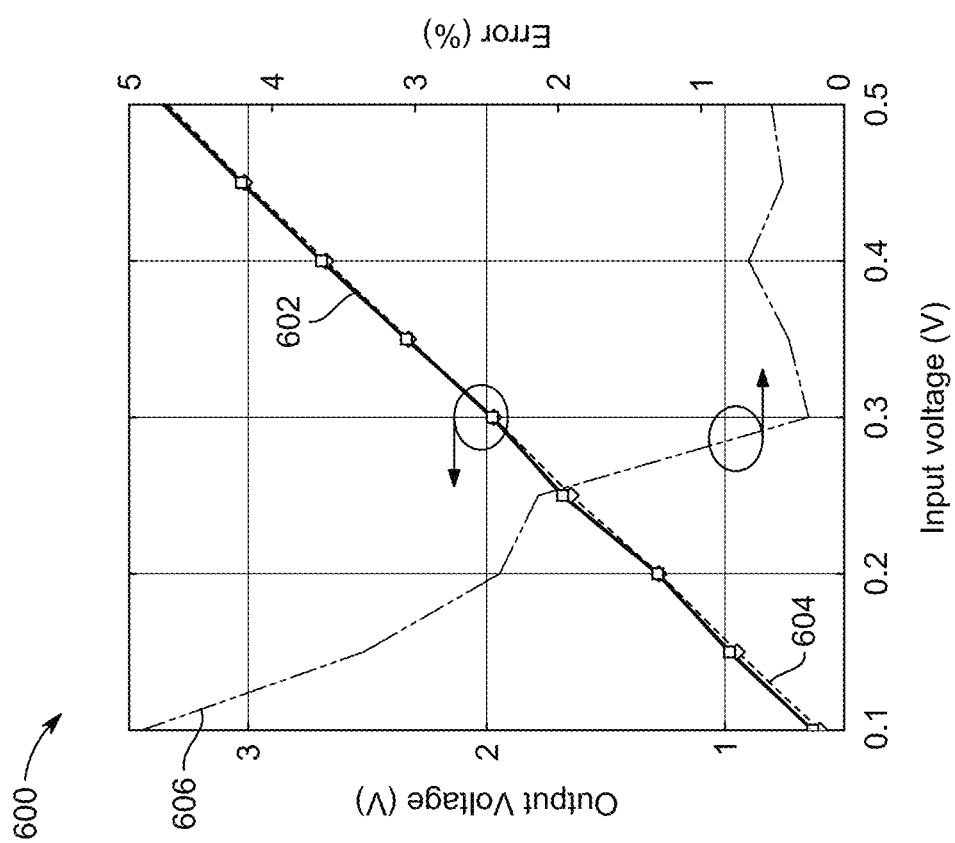
FIG. 6A is a representation of the output voltage versus input voltage for the voltage converter system having SPSC, according to aspects of the present disclosure.

FIG. 6A is a representation 600 of the output voltage versus input voltage for the system 200 with the SPSC configuration. Signal 602 represents the output voltage signal corresponding to the input voltage signal generated by the system 200. Signal 604 represents the output voltage signal corresponding to the input voltage signal generated by the experimental set up 500. Signal 606 represents an error signal representing a difference between the measured output voltage signal and the system 200.

FIG. 6B is a representation 650 of the output voltage versus input voltage for the system 200 with the FSC configuration. Signal 652 represents the output voltage signal corresponding to the input voltage signal generated by the system 200. Signal 654 represents the output voltage signal corresponding to the input voltage signal generated by the experimental set up 500. Signal 656 represents an error signal representing a difference between the measured output voltage signal and the system 200.

FIG. 6A-FIG. 6B validate that the experimental results agree well with the models with an error of less than 5% for all cases.

The first embodiment is illustrated with respect to FIG. 2A-FIG. 5. The first embodiment describes a voltage converter system 200. The system 200 includes an input terminal 202, an output terminal 204, a negator circuit 206, a switched-capacitor converter 220 and a control unit 230. The input terminal 202 is configured to receive an input voltage signal. The output terminal 204 is configured to generate an output voltage signal. The negator circuit 206 is coupled to the input terminal 202 and is configured to provide a polarity conversion of the received input voltage signal to generate a negative input voltage signal. The negator circuit 206 includes a flying capacitor, a pair of first switches and a pair of second switches connected in a H-bridge configuration. The switched-capacitor converter 220 is coupled to the input terminal 202 and the negator circuit 206. The switched-capacitor converter 220 includes a plurality of converter stages. Each stage of the plurality of converter stages includes a capacitor and an assembly of a first switch and a second switch. The control unit 230 is configured to activate or deactivate the pair of first switches, the pair of second switches, the first switch, and the second switch. A configuration of the negator circuit 206 and the switched-capacitor converter 220 results in a voltage conversion ratio between the output voltage signal and the input voltage signal.

In an aspect, the control unit 230 includes two non-overlapping complementary clocks.

In an aspect, the two non-overlapping complementary clocks are configured to be alternatively turned on and off.

In an aspect, the pair of first switches and the pair of second switches of the negator circuit 206 are configured to charge the flying capacitor of the negator circuit 206.

In an aspect, the assembly of the first switch and the second switch of each stage of the plurality of converter stages of the switched-capacitor converter 220 includes a combination of at least one of the first switch and a pair of the second switch, or the second switch and a pair of the first switch.

In an aspect, for each stage of the plurality of converter stages of the switched-capacitor converter 220, the assembly of the first switch and the second switch is configured to charge and discharge the capacitor.

In an aspect, the voltage converter system is configured to operate in two phases.

In an aspect, the two phases of operation of the voltage converter system comprise a charging phase and a discharging phase.

In an aspect, the voltage converter system 200 is configured to generate the output voltage signal in the discharging phase.

In an aspect, the switched-capacitor converter 220 is at least one of a series-parallel switched-capacitor (SPSC) and a Fibonacci switched-capacitor (FSC).

In an aspect, the voltage converter system further includes an output capacitor coupled to the output terminal 204.

In an aspect, the first switch and the second switch are implemented using at least one of a n-channel metal-oxide semiconductor (NMOS), a p-channel metal-oxide-semiconductor (PMOS) and a transmission gate (TG) configuration.

The second embodiment is illustrated with respect to FIG. 2A-FIG. 5. The second embodiment describes a voltage converter. The voltage converter includes an input terminal 202, a negator circuit 206, a switched-capacitor converter 220, a control unit 230, and an output terminal 204. The negator circuit 206 is coupled to the input terminal 202. The negator circuit 206 includes a capacitor, a first pair of switches ($S_{a1}$, $S_{a2}$) and a second pair of switches ($S_{b1}$, $S_{b2}$) connected in a H-bridge configuration. A first switch of the second pair of switches ($S_{b1}$, $S_{b2}$) is connected to the input terminal 202 on a first end and to a first common point on a second end. A first switch of the first pair of switches ($S_{a1}$, $S_{a2}$) is connected to the first common point on a first end and a first ground terminal on a second end. A second switch of the second pair of switches ($S_{b1}$, $S_{b2}$) is connected to a second common point on a first end and a second ground terminal on a second end. A second switch of the first pair of switches ($S_{a1}$, $S_{a2}$) is connected to the second common point on a first end and to an output of the negator circuit 206 on a second end. The capacitor is coupled between the first common point and the second common point. A first input of the switched-capacitor converter 220 is coupled to the input terminal 202, and a second input of the switched-capacitor converter 220 is coupled to the output of the negator circuit 206. The control unit 230 is connected to the negator circuit 206 and the switched-capacitor converter 220. The output terminal 204 is coupled to an output of the switched-capacitor converter 220.

In an aspect, a signal at the output of the negator circuit 206 is configured to be at a same value and an opposite polarity of a signal at the input terminal 202.

In an aspect, the wherein the switched capacitor converter includes from at least one converter stage up to a plurality of the converter stages.

In an aspect, the converter stage includes a capacitor and an assembly of the first switch and the second switch.

In an aspect, the control unit 230 includes two non-overlapping complementary clocks.

In an aspect, the control unit 230 is configured to activate and deactivate the first switch and the second switch.

In an aspect, the voltage converter is a single input single output converter.

In an aspect, the switched-capacitor converter 220 is at least one of a series-parallel switched-capacitor (SPSC) and a Fibonacci switched-capacitor (FSC).

Numerous modifications and variations of the present disclosure are possible in light of the above teachings. It is therefore to be understood that within the scope of the appended claims, the disclosure may be practiced otherwise than as specifically described herein.

The invention claimed is:

1. A solar power voltage converter system, comprising:
a solar array for generating power;
an input terminal configured to receive an input voltage signal from the solar array;
an output terminal configured to generate an output voltage signal;
a negator circuit coupled to the input terminal and configured to provide a polarity conversion of a received input voltage signal from the input terminal to generate a negative input voltage signal, wherein the negator circuit includes a flying capacitor, a pair of first switches and a pair of second switches connected in a H-bridge configuration;
a switched-capacitor converter coupled to the input terminal and the negator circuit, wherein the switched-capacitor converter includes a plurality of converter stages, wherein each stage of the plurality of converter stages includes a capacitor and an assembly of a first switch and a second switch, resulting in a plurality of first switches and a plurality of second switches;
a control unit coupled to the switched-capacitor converter configured to activate or deactivate the pair of first switches, the pair of second switches, the plurality of first switches, and the plurality of second switches; and
wherein a configuration of the negator circuit and the switched-capacitor converter results in a voltage conversion ratio between the output voltage signal and the input voltage signal.

2. The voltage converter system of claim 1, wherein the control unit comprises two non-overlapping complementary clocks.

3. The voltage converter system of claim 2, wherein the two non-overlapping complementary clocks are configured to be alternately turned on and off.

4. The voltage converter system of claim 1, wherein the pair of first switches and the pair of second switches of the negator circuit are configured to charge the flying capacitor of the negator circuit.

5. The voltage converter system of claim 1, wherein the assembly of the first switch and the second switch of each stage of the plurality of converter stages of the switched-capacitor converter comprises a combination of at least one of
the first switch and a pair of the second switch and
the second switch and a pair of the first switch.

6. The voltage converter system of claim 1, wherein for each stage of the plurality of converter stages of the switched-capacitor converter, the assembly of the first switch and the second switch is configured to charge and discharge the capacitor.

7. The voltage converter system of claim 1, wherein the voltage converter system is configured to operate in two phases.

8. The voltage converter system of claim 7, wherein the two phases of operation of the voltage converter system comprise a charging phase and a discharging phase.

9. The voltage converter system of claim 8, wherein the voltage converter system is configured to generate the output voltage signal in the discharging phase.

10. The voltage converter system of claim 1, wherein the switched-capacitor converter is at least one of a series-parallel switched-capacitor (SPSC) and a Fibonacci switched-capacitor (FSC).

11. The voltage converter system of claim 1, further comprises an output capacitor coupled to the output terminal.

12. The voltage converter system of claim 1, wherein the first switch and the second switch of the switched-capacitor converter are implemented using at least one of a n-channel metal-oxide semiconductor (NMOS), a p-channel metal-oxide-semiconductor (PMOS) and a transmission gate (TG) configuration.

* * * * *